(12) United States Patent
Patton et al.

(10) Patent No.: US 8,960,718 B2
(45) Date of Patent: Feb. 24, 2015

(54) GAS GENERATOR HAVING A STORAGE CHAMBER FOR MATERIAL WITH ENDOTHERMIC CHANGE OF STATE

(75) Inventors: Yvonnig Patton, Plougastel Daoulas (FR); François Peremarty, Quimper (FR); Matthew Alan Cox, Centerville, UT (US); Xavier Lelievre, Sizun (FR)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 13/981,461

(22) PCT Filed: Jan. 24, 2012

(86) PCT No.: PCT/EP2012/051064
§ 371 (c)(1),
(2), (4) Date: Jul. 24, 2013

(87) PCT Pub. No.: WO2012/101131
PCT Pub. Date: Aug. 2, 2012

(65) Prior Publication Data
US 2013/0313812 A1 Nov. 28, 2013

(30) Foreign Application Priority Data
Jan. 25, 2011 (FR) .................................. 11 50555

(51) Int. Cl.
*B60R 21/264* (2006.01)
*B60R 21/263* (2011.01)
(Continued)

(52) U.S. Cl.
CPC ........... *B60R 21/263* (2013.01); *B60R 21/2644* (2013.01); *F42B 3/04* (2013.01); *B60R 2021/26017* (2013.01)
USPC ...................................................... 280/737

(58) Field of Classification Search
CPC ...................... B60R 2021/2633; B60R 21/262; B60R 2021/2642; B60R 21/264; B60R 21/263; B60R 2021/263; B60R 21/26
USPC ................................ 280/737, 741, 736, 740
See application file for complete search history.

(56) References Cited

U.S. PATENT DOCUMENTS 3,813,007 A 5/1974 Doin et al.
3,882,673 A 5/1975 Doin et al.
(Continued)

FOREIGN PATENT DOCUMENTS

DE 19726296 A1 12/1998

OTHER PUBLICATIONS

International Search Report and Written Opinion of the ISA, ISA/EP, Rijswijk, NL, mailed Apr. 25, 2012.

*Primary Examiner* — Karen Beck
(74) *Attorney, Agent, or Firm* — Harness, Dickey & Pierce, P.L.C.

(57) ABSTRACT

A gas generator includes a case enclosing a combustion chamber containing at least one pyrotechnic charge, a diffusion chamber, and a chamber for storing a material releasable from the chamber during combustion of the charge, to change state endothermically under the effect of gas coming from this combustion, then be evacuated via the diffusion chamber. The material is a liquid stored at atmospheric pressure. The chamber has at least one inlet opening, and a series of outlet openings. The outlet openings are arranged within a wall separating the chamber from the diffusion chamber. The charge and the combustion and diffusion chambers are dimensioned such that during combustion, at least one portion of gas flow generated by the charge opens at least the inlet opening and penetrates into the chamber provoking the escape of the material via the outlet openings, then its endothermic change in state, mainly in the diffusion chamber.

22 Claims, 10 Drawing Sheets

(51) Int. Cl.
*F42B 3/04* (2006.01)
*B60R 21/26* (2011.01)

(56) References Cited

U.S. PATENT DOCUMENTS

| | | | |
|---|---|---|---|
| 5,660,236 A * | 8/1997 | Sears et al. ...................... 169/72 |
| 6,076,468 A | 6/2000 | DiGiacomo et al. |
| 6,196,583 B1 | 3/2001 | Ruckdeschel et al. |
| 6,244,623 B1 * | 6/2001 | Moore et al. .................. 280/737 |
| 6,412,814 B1 * | 7/2002 | Huber et al. .................. 280/736 |
| 6,481,357 B1 | 11/2002 | Lindner et al. |
| 7,686,330 B2 * | 3/2010 | Meixner et al. ................ 280/741 |
| 7,770,924 B2 * | 8/2010 | Cox et al. ...................... 280/741 |
| 7,814,838 B2 * | 10/2010 | McCormick .................. 102/530 |
| 7,878,536 B2 * | 2/2011 | Rose et al. ..................... 280/737 |
| 8,708,367 B2 * | 4/2014 | Duvacquier et al. .......... 280/741 |
| 2004/0195813 A1 * | 10/2004 | Canterberry et al. .......... 280/741 |
| 2005/0029787 A1 * | 2/2005 | Young et al. .................. 280/741 |
| 2006/0261584 A1 * | 11/2006 | Blackburn .................... 280/741 |
| 2010/0013201 A1 * | 1/2010 | Cox et al. ...................... 280/741 |
| 2010/0230942 A1 | 9/2010 | Rose et al. |
| 2011/0221173 A1 * | 9/2011 | Cox et al. ...................... 280/736 |

\* cited by examiner

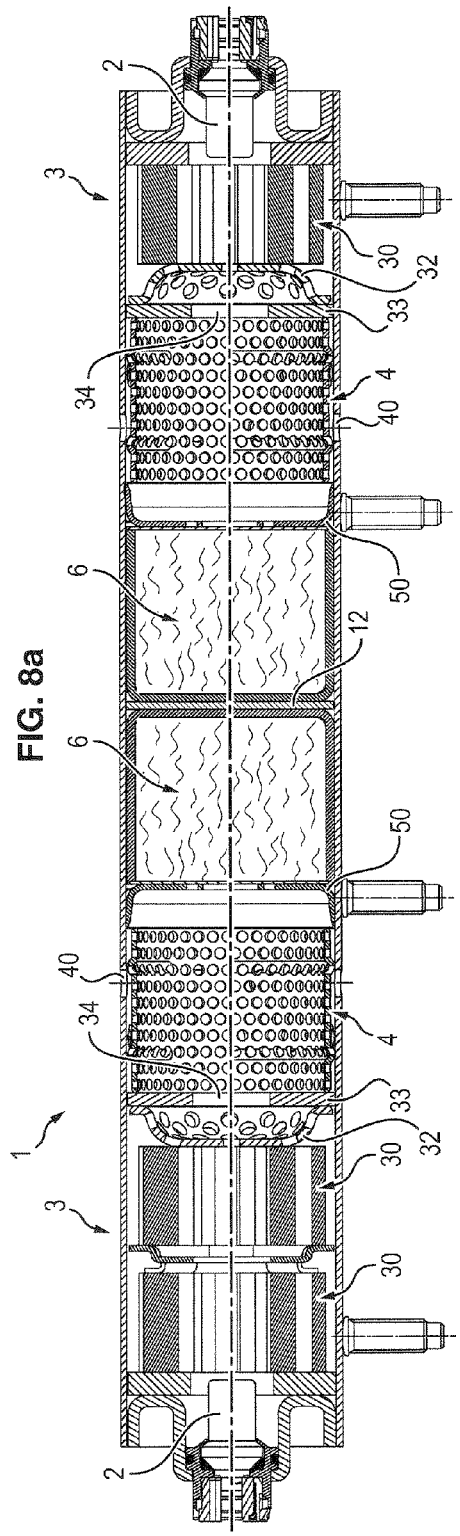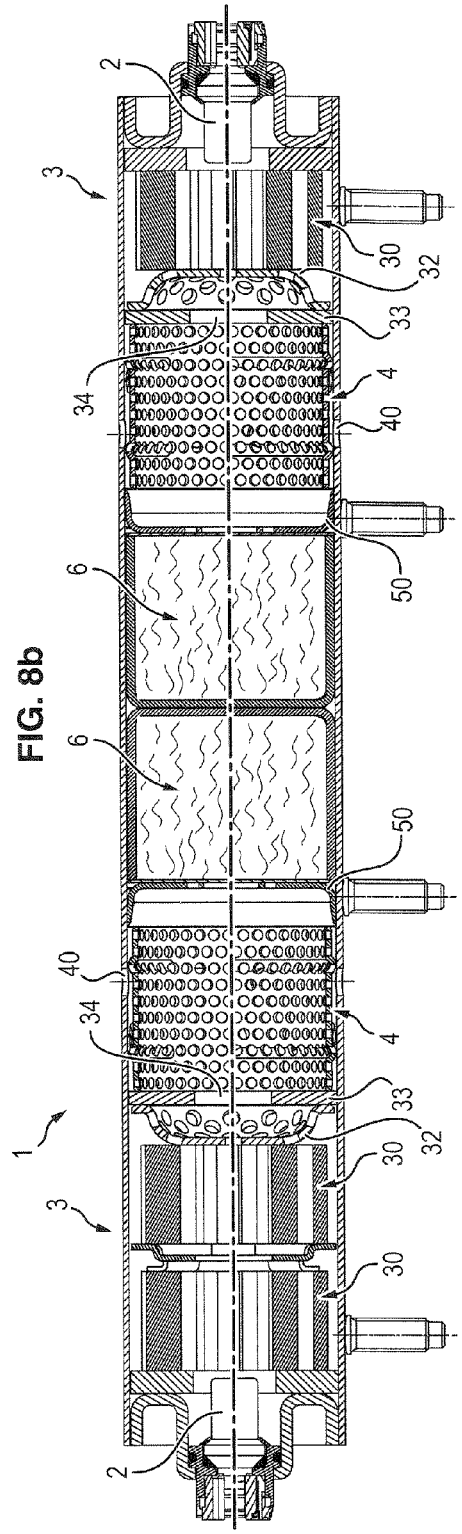

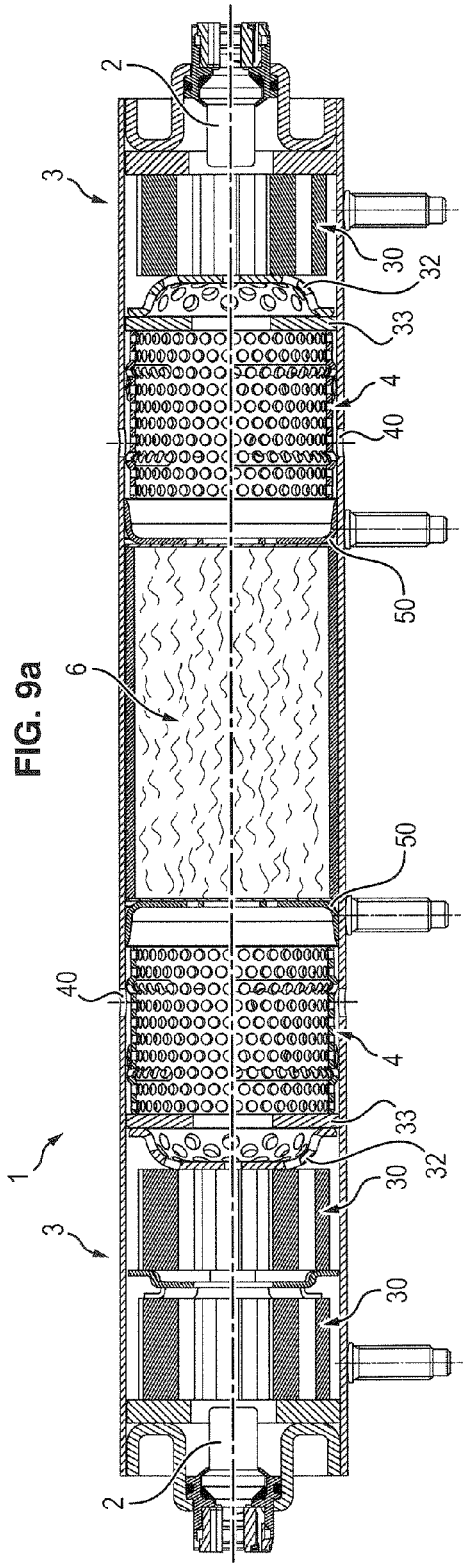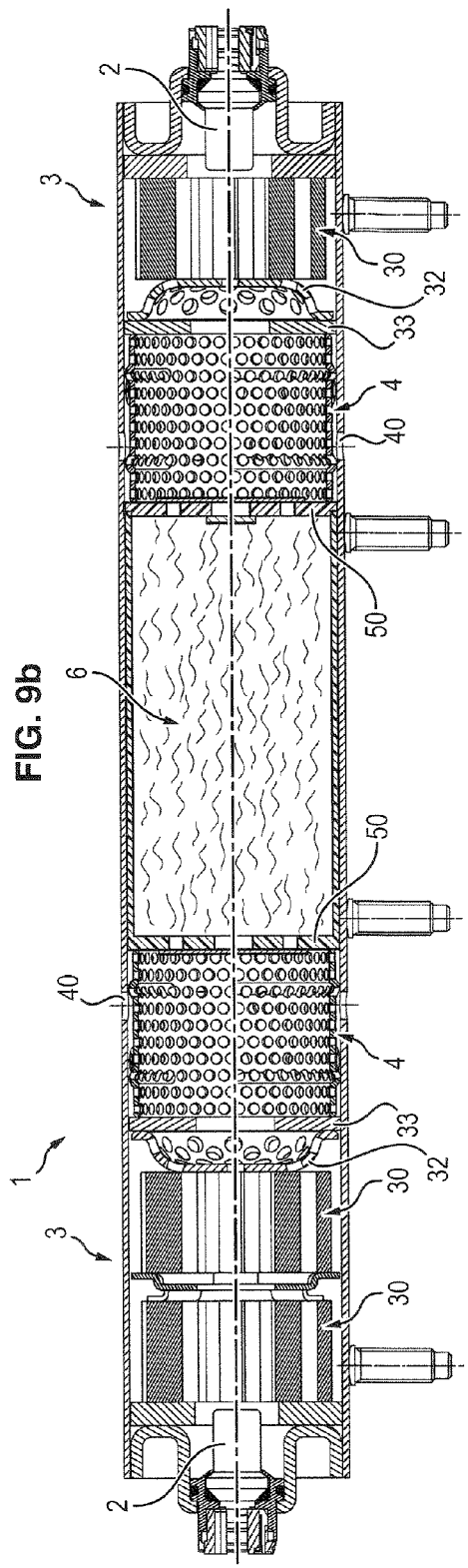

GAS GENERATOR HAVING A STORAGE CHAMBER FOR MATERIAL WITH ENDOTHERMIC CHANGE OF STATE

CROSS-REFERENCE TO RELATED APPLICATIONS

This application is a 371 U.S. National Stage of International Application No. PCT/EP2012/051064, filed Jan. 24, 2012. This application claims priority to French Patent Application No. 1150555, filed Jan. 25, 2011. The disclosures of the above applications are entirely incorporated by reference herein.

FIELD

This invention relates to a gas generator for inflating an inflatable protective bag for motor vehicle, generally referred to as an "airbag".

BACKGROUND

It is already known through prior art, a gas generator which includes an envelope of a general cylindrical shape, inside of which are arranged successively a combustion chamber and a diffusion chamber. These two chambers are separated by a partition wall, pierced with an orifice which is itself sealed by a seal.

SUMMARY

The combustion chamber contains an initiator and a pyrotechnic charge. The diffusion chamber comprises several gas evacuation orifices and contains a metal filter on the evacuation path of these gases.

When the initiator is activated, the hot gases given off by the combustion of the pyrotechnic charge provoke an increase in pressure in the combustion chamber, which in turn causes the breakage of the seal separating it from the diffusion chamber. The gases are then evacuated through the diffusion chamber. The filter located inside the latter makes it possible to filter particles contained in the gases and also makes it possible to cool the exiting gases, due to its substantial thermal exchange surface.

However, this filter is heavy, bulky and the energy that it absorbs is in no way used to inflate the airbag which is detrimental to the output of the generator. Finally, the material comprising the bag can be degraded by the hot gases.

In order to resolve these defects, it is also known through prior art generators wherein has been added a reserve for a material able to change state endothermically, under the effect of the gasses coming from the combustion of the pyrotechnic charge.

As such, due to this endothermic reaction, the gases coming from the combustion of the pyrotechnic charge have their temperature lowered, which solves the problem mentioned hereinabove.

A material that is widely used to achieve this purpose is very simply water.

The solutions described in prior art make use of a water storage chamber, which is emptied under the action of a piston or deformed and emptied under the action of the pressure at the exterior of said chamber. It is the gases generated by the combustion of the pyrotechnic charge which, through the increase in pressure, displace the piston or compress the walls of the chamber.

Examples of such solutions are described in patent documents BE 775 422, BE 775 997, U.S. Pat. No. 6,481,357, U.S. Pat. No. 6,076,468, and US 2010/0230942 in particular.

It is however understood that these parameters, i.e. the proper displacement of the piston or the proper compression of the chamber with the purpose of expulsing the water that it contains are difficult to control.

Furthermore, the use of a piston complicates the implementation of the generator and increases its cost.

Moreover, document U.S. Pat. No. 6,244,623 discloses a gas generator for airbag wherein a pressurised fluid is stored in a reservoir. The combustion of the pyrotechnic charge participates only in the opening of a closing seal of the reservoir. Once the seal is opened, the fluid evacuates on its own.

DE 197 26 296 relates to a structure wherein are implemented zones referred to as "pitots" wherein differences in pressure and in flow, difficult to control, take place.

In this context, this invention has for objective to propose a gas generator comprising, as in prior art, a material able to be released from the chamber wherein it is located, under the effect of the combustion of the pyrotechnic charge, and to change state endothermically under the effect of the gasses coming from this combustion, but without making use of a moveable part acting on the container or the receptacle which receives said material such as water.

Another objective of the invention is to lower the outlet temperature of the gasses coming from a pyrotechnic generator at a temperature that is compatible with the fabric of the bag associated with the gas generator, while losing as few as possible moles of gas and by simultaneously reducing the mass of the generator, at least in relation to a pyrotechnic generator with a filter or piston.

In certain circumstances, this temperature can be in the vicinity of 900K (approximately 627° C.), for a pyrotechnic generator.

These objectives as well as others are achieved in accordance with the invention.

As such, the latter relates to a gas generator for inflating an inflatable protective bag for motor vehicle, which includes a case, which encloses according to its longitudinal axis X-X', a combustion chamber containing at least one pyrotechnic charge able to be ignited by an initiator, a diffusion chamber having at least one communication orifice with the exterior, able to receive the gases coming from the combustion of the charge and evacuate them towards the exterior, as well as a storage chamber for a material able to be released from said chamber under the effect of the combustion of said pyrotechnic charge, to change state endothermically under the effect of the gasses coming from this combustion then to be evacuated via said diffusion chamber, characterised by the fact that:
  said material is a liquid stored at atmospheric pressure;
  said chamber includes at least one opening referred to as "inlet", as well as at least one opening referred to as "outlet", these openings normally being sealed in the absence of combustion of the charge;
  said chamber is separated from the diffusion chamber by a fixed wall through which are arranged said outlet opening or said outlet openings;
  the charge and said combustion and diffusion chambers being dimensioned in such a way that under the effect of the combustion, at least one portion of the gas flow generated by the pyrotechnic charge opens the inlet opening or openings and penetrates into said chamber by this or these inlet opening(s), provoking the escape of said material via the outlet opening or openings, then its endothermic change in state, mainly in the diffusion chamber.

Thanks to this structure, a portion of the gas flow, generated by the pyrotechnic charge opens the storage chamber of the material and exerts a pressure on the material, which provokes the escape of the latter, via the outlet openings, by provoking its spraying and its change of state, for example to transform it into a gas.

There is therefore no part in movement of which the operation is difficult to control.

According to other advantageous and non-restricting characteristics of this invention:

- the material is a material able to be vaporised;
- the surface of said inlet opening or the sum of the surfaces of said inlet openings has a surface greater than that of the surface of said outlet opening or the sum of the surfaces of said outlet openings;
- said diffusion chamber is arranged axially between the combustion chamber and the chamber and the inlet opening is also arranged in said fixed wall;
- the inlet opening is centred on said longitudinal axis and said outlet openings are peripheral;
- the gas generator includes an intermediate chamber inserted axially along the axis X-X', between said combustion chamber and said diffusion chamber, said storage chamber is arranged inside said intermediate chamber and said inlet opening or openings of the chamber emerge inside said intermediate chamber;
- the case is cylindrical, said chamber is of annular shape centred on the axis X-X' and its length taken along the axis X-X' is less than that of said intermediate chamber;
- said chamber extends in the centre of the intermediate chamber along the axis X-X' and its length taken along the axis X-X' is less than that of said intermediate chamber;
- said material is contained in a frangible envelope which, in the absence of combustion of the pyrotechnic charge, is applied against the inlet and outlet openings in order to seal them;
- the inlet and outlet openings of said wall are, in the absence of combustion of the charge, sealed by frangible seals;
- at least one portion of the gas flow generated by the pyrotechnic charge opens the inlet opening, more preferably all said openings;
- said material able to be vaporised is comprised of water and of a mineral anti-icing compound, organic or of a mixture of the two;
- said material that can be vaporised is comprised of water and of an anti-icing compound, such as calcium chloride or potassium carbonate;
- the generator includes a second combustion chamber containing at least one second pyrotechnic charge able to be ignited by a second initiator, a second diffusion chamber having at least one communication orifice with the exterior, as well as a second storage chamber for a liquid material stored at atmospheric pressure, said storage chambers being an extension of each other;
- the generator comprises a second combustion chamber containing at least one second pyrotechnic charge able to be ignited by a second initiator, a second diffusion chamber having at least one communication orifice with the exterior, as well as a single and unique storage chamber for a liquid material stored at atmospheric pressure.

Other characteristics and advantages of this invention shall appear when reading the following detailed description of a preferred embodiment.

DRAWINGS

This description will be provided in reference to the annexed drawings wherein:

FIGS. 8a and 8b are front views, according to a median and longitudinal cross-section plane, of two other embodiments of a generator according to the invention;

FIGS. 9a and 9b are views analogous to the preceding views of a further two embodiments;

DETAILED DESCRIPTION

Figure 1:
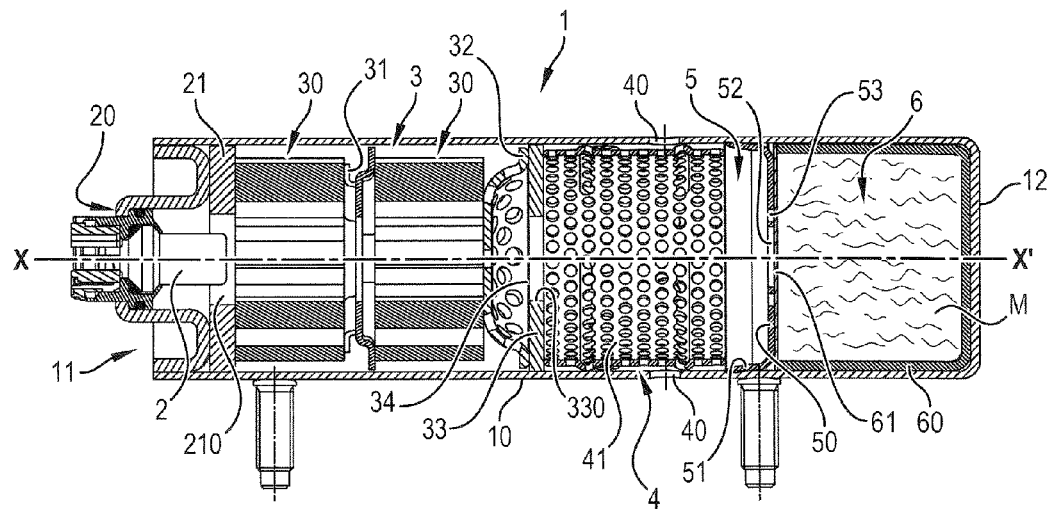
FIG. 1 is a front view, according to a median and longitudinal cross-section plane, of a generator according to the invention.

A first embodiment of the gas generator in accordance with the invention shall now be described in reference to FIGS. 1 to 5.

This generator 1 includes a tubular case 1 of elongated shape, more preferably cylindrical, of longitudinal axis X-X'.

In an embodiment not shown here, this case can have a discoid shape, i.e. having a longitudinal extent that is less than its diameter.

This case is for example made of metal, and its cylindrical envelope 10, centred on the axis X-X' is open at one 11 of its ends (on the left of FIG. 1), materialising as such a mouth, while its other end 12 is closed, sealed by a flat bottom arranged transversally, i.e. perpendicularly to the axis X-X'.

The case 1 encloses, according to its longitudinal axis X-X' in the extension of each other, from the mouth 11 towards the bottom 12, a combustion chamber 3, a diffusion chamber 4, and a storage chamber 6 of a material able to be released from this chamber.

We shall describe more precisely hereinafter each of these parts.

The generator includes a pyrotechnic initiator 2 of the usual type, with connection pins. It is arranged axially in case 1, by the opening 11 forming a mouth.

More precisely, this initiator is mounted inside an intermediate part or adapter sleeve 20. The latter is maintained in place inside the envelope 10 by welding or crimping and its outer diameter is determined to possibly be force fit into said case 1.

A component 21 forming a means of immobilisation for the pyrotechnic material, (for example a spring or a foam washer), is arranged downstream of this initiator 2, when the direction of the axis X-X' is considered.

Its central opening is referenced as 210, and is partially occupied by the head of the initiator 2.

In the example embodiment shown here, this combustion chamber receives two separate monolithic grains 30 of a pyrotechnic charge such as propellant.

However, in embodiments not shown, this could entail a single grain or a pyrotechnic charge having another form (pellets or discs, for example).

Between the two grains 30 is arranged a spacer part 31 of which the purpose is to maintain the two grains separate from each other.

The first grain (on the left of the figure) is therefore immobilised between the parts 21 and 31.

The second grain presses against a bulged grid 32 which, itself, is in contact with a wall 33 open at its centre by an orifice 330 forming a nozzle. This wall 33, perpendicular to the axis X-X', delimits the second end of the combustion chamber 3.

The wall 33 is crimped or welded in the envelope 10.

The orifice 330 is sealed by a frangible seal 34, sealing the combustion chamber 3, in the absence of combustion of the pyrotechnic charge, this seal being able to yield under the effect of a predetermined pressure inside the combustion chamber.

Downstream of the wall 33 extends the diffusion chamber 4.

The generally cylindrical wall of the matter communicates towards the exterior of the generator by a series of openings 40 arranged radially.

Although this cannot be seen in FIG. 1, these openings 40 can possibly be sealed by a seal able to yield under the effect of a predetermined pressure inside the diffusion chamber.

In this chamber, is mounted a tubular cylindrical part, in the form of a grid 41, having a multitude of small openings.

Its function shall be explained hereinafter.

Finally, the diffusion chamber is separated from a storage chamber 6 by a cup referenced as 5. In the embodiment shown here, this cup is formed of a flat wall 50 which extends perpendicularly to the axis X-X' and of an edge raised to 90° substantially, which presses against the internal face of the case 1 with the purpose of immobilising it.

This edge is turned in the direction of the diffusion chamber 4.

The cup 5 is press fitted inside the envelope 10, crimped or welded into the latter.

The wall 50 has an opening referred to as inlet 52 and, in this case, a series of openings referred to as outlet 53.

This is however a preferred embodiment. As such, in an alternative not shown, there could be two or several inlet openings 52.

In the example shown here, the inlet opening 52 is centred on the axis X-X' and the outlet openings 53 are arranged peripherally, according to a regular angular distribution, around the inlet opening.

Figure 2:
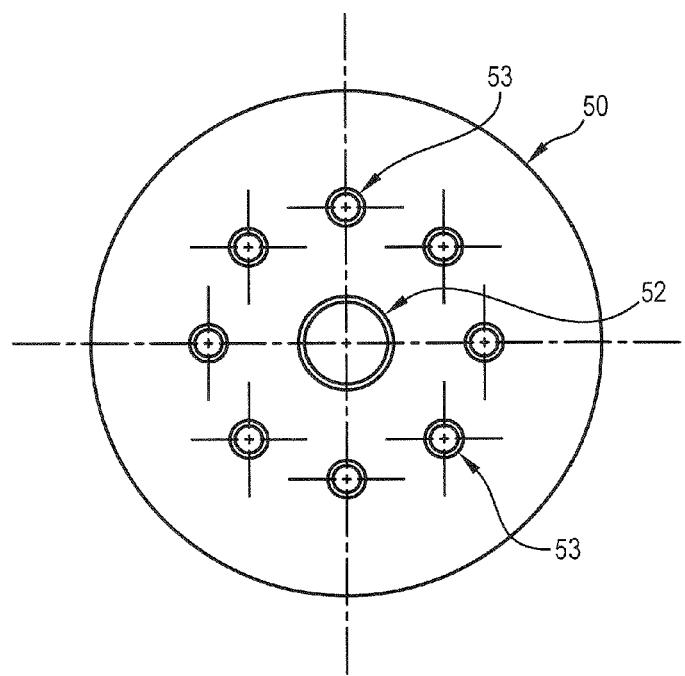
FIG. 2 is a front view of an example embodiment of a wall which separates the diffusion chamber of the generator from the storage chamber of the material.

FIG. 2 shows a possible distribution of these inlet and outlet openings.

For the purposes of information only, the opening 52 has a diameter of a magnitude of 6 mm, while the openings 53 each have a diameter of a magnitude of 2 mm, for an application of the passenger type.

Preferentially, the diameter of the opening 52 is approximately three times greater than the diameter of the openings 53.

In the absence of combustion of the charge 30 present in the chamber 3, these openings 52 and 53 are normally sealed, as such as shall be described more precisely hereinafter.

Finally, the generator receives the storage chamber 6 of a material M able to be released from this chamber under the effect of the combustion of the pyrotechnic charge present in the combustion chamber 3.

This material M is more preferably in liquid state.

In the example shown here, the storage chamber 6 is comprised of a box 60 of a shape complementary to that of the case 1 and of which the top is closed by a film 61, of the frangible type, which is firmly applied against the wall 5, here its bottom 50, and seals the openings 52 and 53 thereof.

The film 61 can be made from any type of material that is resistant to the material M (i.e. which does not alter over time in contact with material M) and which makes it possible to limit the evaporation of the latter and this, during the life cycle of the generator. In other terms, this material must meet the specifications of the automobile manufacturers.

A plastic material, such as polypropylene (PP), a metal such as stainless steel or aluminium can for example be mentioned.

The box 60 can be made from a material such as those mentioned for the film 61.

The material M has the characteristic of being able to change state, endothermically, under the effect of the gasses coming from the combustion of the pyrotechnic charge 30.

This is more preferably a material able to be vaporised.

More preferably, this material is comprised of water and of an anti-icing compound, mineral, organic or of a mixture of the two.

Even more preferably, this material is comprised of water and of an anti-icing compound, such as calcium chloride or potassium carbonate.

Figure 3:
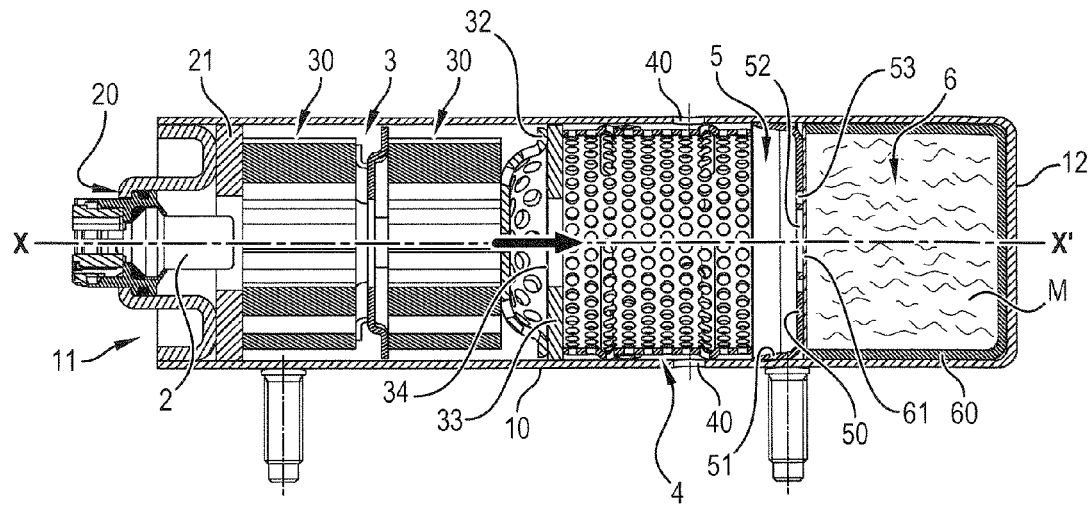
FIGS. 3 and 4 are views analogous to FIG. 1 intended to explain the operation of the generator.
Figure 4:
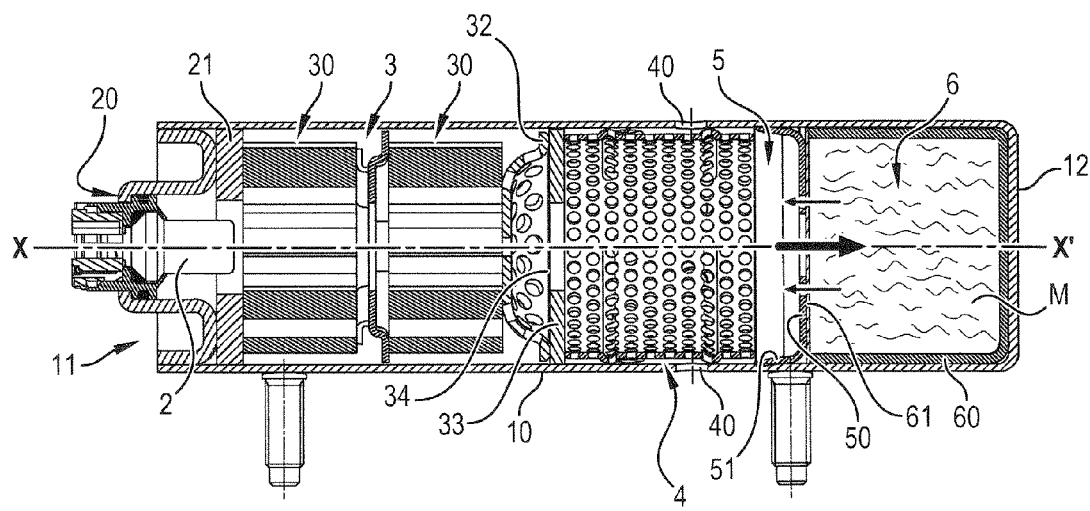

A possible operation of the device in FIG. 1 is shown in FIGS. 3 and 4 and is detailed hereinafter, by considering that the material M is water.

Following the ignition of the initiator 2, the propellant grains present in the combustion chamber are initiated.

The pressure of the gasses in the latter increases and the seal 34 yields beyond a predetermined pressure.

The gas flow generated passes through the diffusion chamber 4 by being displaced then generally axially in the direction of the wall 5.

At the time of the impact of the hot gas flow against the film 61 which seals the chamber 6, the latter breaks or is burnt by thermomechanical aggression, in such a way that the flow of hot gases penetrates inside said chamber 6 by the opening 52.

This phenomenon is shown in the form of a solid line arrow in FIG. 4.

These hot gases axially "push" the liquid present in the chamber 6, in the manner of a piston, which pushes it to exit via the openings 53.

Ideally, the openings 52 and 53 are open at the same time, via joint thermal and mechanical aggression. However, it may be that the openings 53 are open only slightly after the opening or openings 52, under the action of the pressure exerted by the liquid.

By adapting the dimension of the outlet openings 53, the fineness of the spraying of the water contained in the chamber 6 is adjusted.

The hot gases coming from the combustion of the pyrotechnic charge 30 then mix with the liquid sprayed in the diffusion chamber 4, causing it to be heated and vaporised.

The water is vaporised firstly inside the diffusion chamber 4, then the vaporisation takes place progressively in the chamber 6, wherein there is then a volume released by the exiting of a portion of the water.

This change in state takes place via an endothermic reaction, which lowers the temperature of the combustion gasses.

The gaseous mixture generated as such then exits the generator to inflate the airbag, via the openings 40.

When the openings 40 are sealed by seals, the latter make it possible to prevent a minute portion of the gas flow from exiting directly from the diffusion chamber 4, before having been cooled by the vaporisation of the water.

The diffusion chamber 4, and more particularly its grid 41, has for function to capture any pyrotechnic particles that were not burnt, as well as the residue of the thermomechanically aggressed elements during the operation of the generator.

However, due to its reduction in thickness in relation to a "conventional" filter in accordance with prior art, it does not have for function to cool the combustion gases.

The size of the pyrotechnic charge 30 as well as the length of the diffusion chamber 4 are substantial parameters as it must be ensured that the stream of pyrophoric gases enters inside the chamber 6, in order to provoke a piston effect.

By way of example, the length of the diffusion chamber 4 is between 10 mm and 50 mm, more preferably in the vicinity of 30 mm, for a generator of which the diameter is between 30 mm and 50 mm and which is utilised for the protection of a passenger.

In order for there to be a vaporisation of water, the latter must preferably be diffused in the diffusion chamber in the form of fine droplets.

The respective dimensions of the diffusion chamber 4, of the chamber 6 and of the openings 52 and 53 are chosen, in such a way that the pressure exerted by the stream of gas on the liquid is greater than the pressure in the diffusion chamber 4, so that the liquid is sprayed in the diffusion chamber 4.

The pressure in the diffusion chamber 4 is less than that in the chamber 6, the latter being at a maximum of 20 MPa. This pressure in the diffusion chamber must be as low as possible in order to obtain a vaporisation temperature that is as low as possible.

As indicated, the material present in the chamber 6 is preferably water and anti-icing, in such a way as to be able to operate in temperature ranges located typically between −40 and 90° C.

As such, a mixture comprising 70% to 90% water and 30% to 10% calcium chloride is entirely satisfactory.

It can also be considered to use a mixture comprised of 60% to 80% water and 40% to 20% potassium carbonate.

Finally, a mixture of water, propanediol and calcium chloride ($CaCl_2$) can also be used.

However, the material M can have other forms. Note in particular water encapsulated in silica beads, the latter being thermofusible under the effect of the combustion of the pyrophoric gases, releasing as such the water that they contain.

Figure 5:
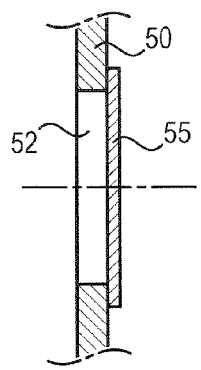
FIG. 5 is a partial and cross-section view of another embodiment of the wall of FIG. 2.

FIG. 5 shows a different form of embodiment of the wall 5, wherein the bottom 50 has openings 52 and 53 sealed by a frangible seal 65 which is added to it. The latter is able to be opened under the effect of the flow of pyrophoric gases.

A second and a third embodiment of the invention shall now be described in reference to FIGS. 6 and 7. The latter are diagrammatical, however, elements that are identical to those described in liaison with the first embodiment bear identical numerical references and shall not be described in detail again.

These two embodiments differ from the first, mainly in that the diffusion chamber 4 is no longer located at the centre of the generator, but in the vicinity of its end 12, opposite that carrying the initiator 2 and in that the storage chamber of the material M is housed inside an intermediate chamber, inserted between the combustion chamber 3 and said diffusion chamber 4.

In these two embodiments, the diffusion chamber is then referenced as 4' and its openings allowing for the evacuation of the gasses in the direction of the airbag are referenced as 40'.

The intermediate chamber bears the reference 7.

Figure 6:
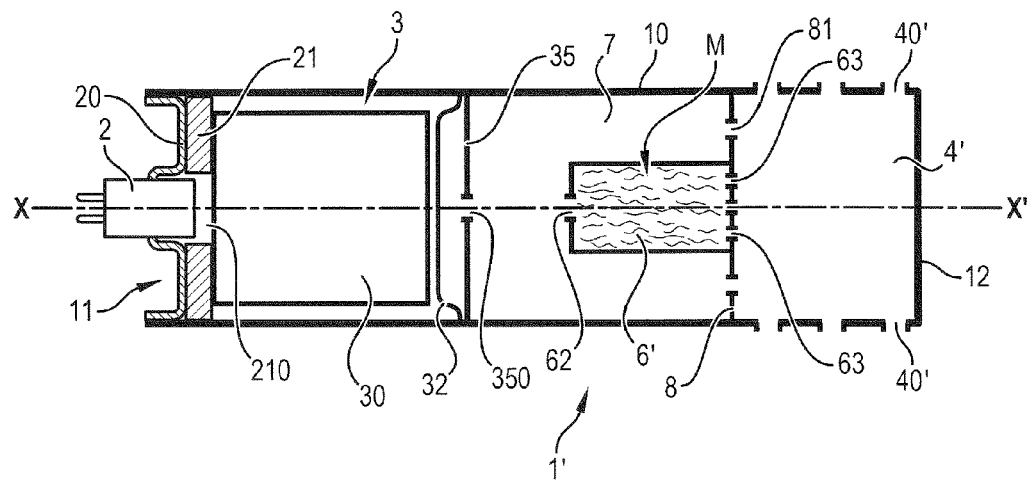
FIGS. 6 and 7 are diagrams representing two other embodiments of a generator in accordance with the invention.

By referring to the embodiment in FIG. 6, it can be seen that the combustion chamber 3 is separated from the intermediate chamber 7 by a wall 35, provided with a central orifice 350 forming a nozzle. This orifice is sealed although this is not shown in the figures, when the pyrotechnic charge does not burn.

The wall 35 is perpendicular to the longitudinal axis X-X'. It is crimped or welded inside the envelope 10. The orifice 350 is centred on the axis X-X'.

A wall 8, perpendicular to the axis X-X', separates the intermediate chamber 7 from the diffusion chamber 4'. It is also crimped or welded into the envelope 10.

The storage chamber of the material M, referenced as 6', extends to the centre of the intermediate chamber 7, along the axis X-X'.

The envelope 10 being more preferably cylindrical, the chamber 6' is also but with a lower diameter. It is coaxial to said envelope 10, as shown in figure.

This chamber 6' is also sealed by the wall 8. Its outlet openings 63 are arranged inside this wall 8.

Moreover, the inlet opening 62 is arranged in the wall of the chamber 6' located at the opposite end of that comprising the wall 8. The inlet opening 62 is centred on the longitudinal axis X-X'.

The length of the chamber 6, taken along this axis X-X' being less than that of the intermediate chamber 7, the inlet opening 62 is located across from the orifice 350, but at a certain distance from the latter.

It would also be possible to have several inlet orifices 62 instead of a single one.

In the absence of combustion of the charge 30, said openings 62 and 63 are normally sealed, although this is not shown in the figure.

Finally, the wall 8 is pierced with several orifices 81, arranged, more preferably according to a regular angular distribution, in the annular zone of the wall 8 that extends around the chamber 6'. These orifices 81 allow for a direct communication between the intermediate chamber 7 and the diffusion chamber 4'.

The orifice 81 is generally not sealed. It can however be sealed.

Finally, note that the case is referenced as 1'.

The operation of this device is as follows.

Following the ignition of the initiator 2, the propellant grains 30 present in the combustion chamber 3 are initiated.

The gas flow generated then penetrates into the intermediate chamber 7 where the majority of it breaks or burns the seal which seals the inlet opening 62.

Moreover, a portion of these hot gases is also directed to the annular portion of the intermediate chamber 7, passes through the orifices 81 and emerges inside the diffusion chamber 4'.

The hot gases that penetrated inside the chamber 6' "push" the liquid present in the chamber 6', which has for effect to provoke the breakage of the seals sealing the outlet openings 63 and to provoke, as described above, the vaporisation of the liquid mainly inside the diffusion chamber 4'. The cooled gases are then evacuated through the orifices 40' in the direction of the airbag.

Figure 7:
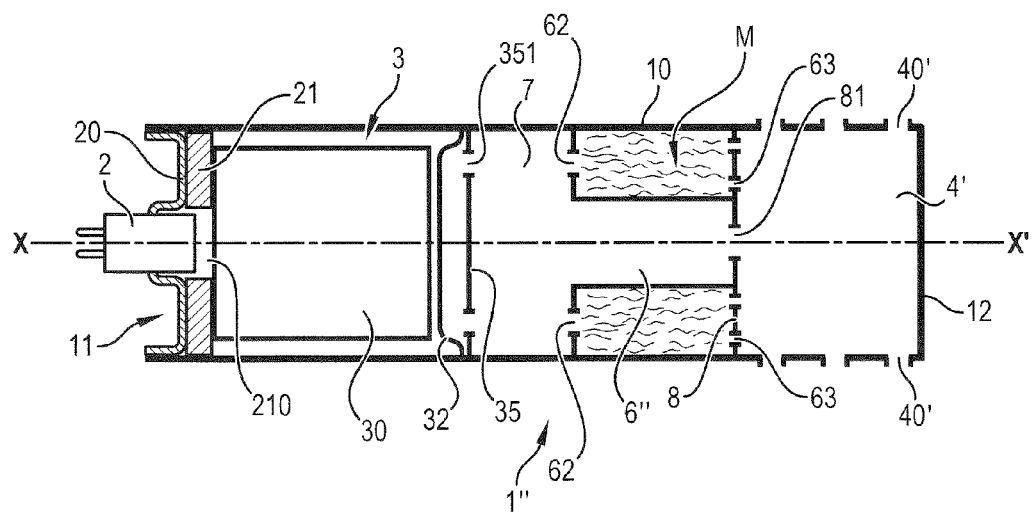

The third embodiment of the generator in accordance with the invention, shown in FIG. 7 differs from the second in that the storage chamber of the material M (referenced as 6") is annular.

It is arranged inside the intermediate chamber 7, in such a way that its outside wall comes into contact with the inside wall of the cylindrical envelope 10.

The length of the chamber 6", taken along the axis X-X' is also less than the length of the intermediate chamber 7.

The wall 35 is this time pierced with a plurality of orifices 351, arranged more preferably according to a uniform angular distribution and sealed in the absence of combustion of the charge 30.

The inlet opening or openings 62 are arranged on the face of the chamber 6" located across from the wall 35, and in such a way that each opening 62 is aligned with an orifice 351.

Finally, the orifice 81 is this time arranged at the centre of the intermediate chamber 7, i.e. centred on the axis X-X'.

The case is referenced as 1".

The operation of this third embodiment is similar to the second, except that the flow of gas generated exits by the orifices 351 and hits the seals of the inlet openings 62 provoking the exit of the liquid via the outlet openings 63 and the vaporisation of this material inside the chamber 4'.

In the two embodiments which have just been described the criteria concerning the ratios between the surfaces of the inlet 62 and outlet 63 openings are identical to what has been described for the generator in accordance with the first embodiment. The same applied with regards to the frangible envelope or the frangible seals sealing the openings 62 and 63.

FIGS. 8 and 8' show two embodiments that are very close to another alternative embodiment of the generator. It can be qualified as a "double generator", due to the fact that it groups together, in a certain manner, two generators of the type of that described in particular in FIG. 1. In practice, these generators comprise at least one wall 12 separating the two generators in the region located between the two chambers receiving the liquid M.

The wall 12 can be a part comprised of the envelope 10 and assembled inside the latter, for example via welding, crimping or fore fitting, as shown in FIG. 8b, or be the bottom wall of one of the chambers receiving the liquid M as shown in FIG. 8a.

In the left portion of each of these devices, this entails a combustion chamber 3 which comprises a first pyrotechnic charge, for example in the form of two propellant grains 30, while the right portion comprises a second pyrotechnic charge, for example in the form of a single grain of propellant.

This device can be provided in such a way that the two combustion chambers are initiated at the same time (requires a high flow of gas), or in an offset manner.

In any case, each portion of the generator can operate independently from the other.

In these figures, the numerical references used that are identical to those of the preceding figures designate the same elements.

The generators in FIGS. 9a and 9b are substantially of the same type as the preceding ones. However, they have the particularity of having a single and unique chamber 6.

The liquid at atmospheric pressure is therefore stored in a single chamber 6, which is closed by two opposite walls 50.

This chamber, when it is made as a single part, makes it possible to make savings in terms of the number of parts and material.

It can take the form of a recipient made of plastic material in a single piece, with a wall 50 integrated, the other wall being added and fixed, for example by ultrasonic welding.

Figure 10:
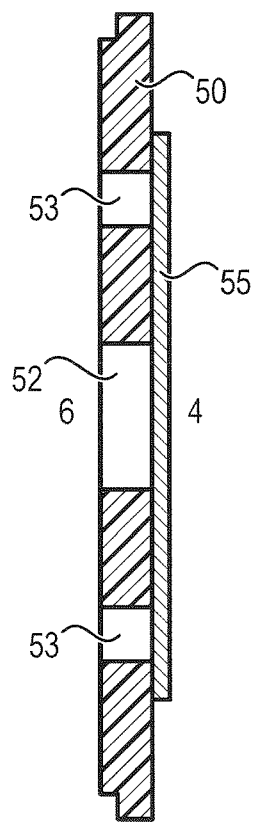
FIGS. 10 to 12 are cross-section views of three alternative embodiments of the wall that separates the diffusion chamber of the generator from the storage chamber of the material.

FIG. 10 shows a wall 50 against which is added a seal 55, on the side of the combustion chamber 4. This seal only has the function of a seal in order to retain the liquid inside the chamber until the generator is lit.

Ideally, the portions of the seals sealing the inlet nozzles open under the effect of the stream of gas generated by the ignited combustion chamber across from it.

In order to prevent the opening of all of the inlet nozzles by the igniting of a single combustion chamber, which could generate a leak of liquid detrimental to the effectiveness of the cooling system, an additional device can be incorporated preventing the opening of the inlet nozzle under the pressure of the liquid.

Figure 11:
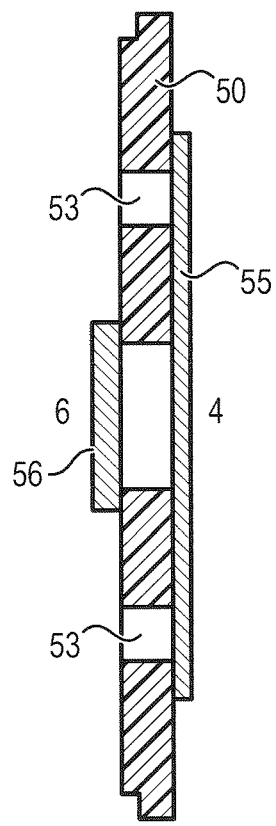

As such, in the embodiment in FIG. 11, the wall 50 further comprises an additional part 56 which is held, by its periphery, at the edges of the opening 52.

As such, the liquid contained in the chamber 6 thrusts the additional part against the wall 50, while the flow of gas generated comes to allow for the detaching of said part, on its periphery.

Figure 12:
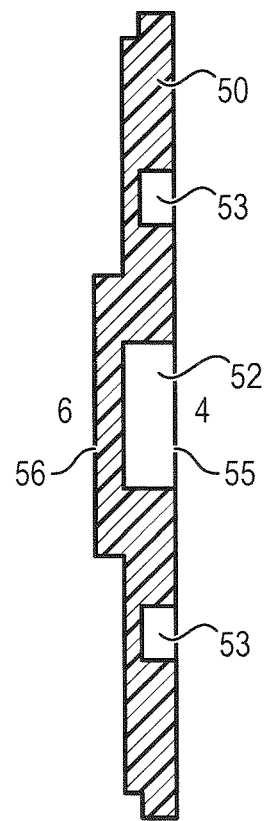

In the embodiment in FIG. 12, the additional part 56, the wall 50 and the seal 55 form the same single part. According to the stress (pressure of the stream of gas or pressure of the liquid) the element sealing the inlet nozzle is tensile or shear stressed. According to the dimensioning chosen, the element does not open under the pressure of the liquid but solely under the effect of the stream of gas.

Figure 13:
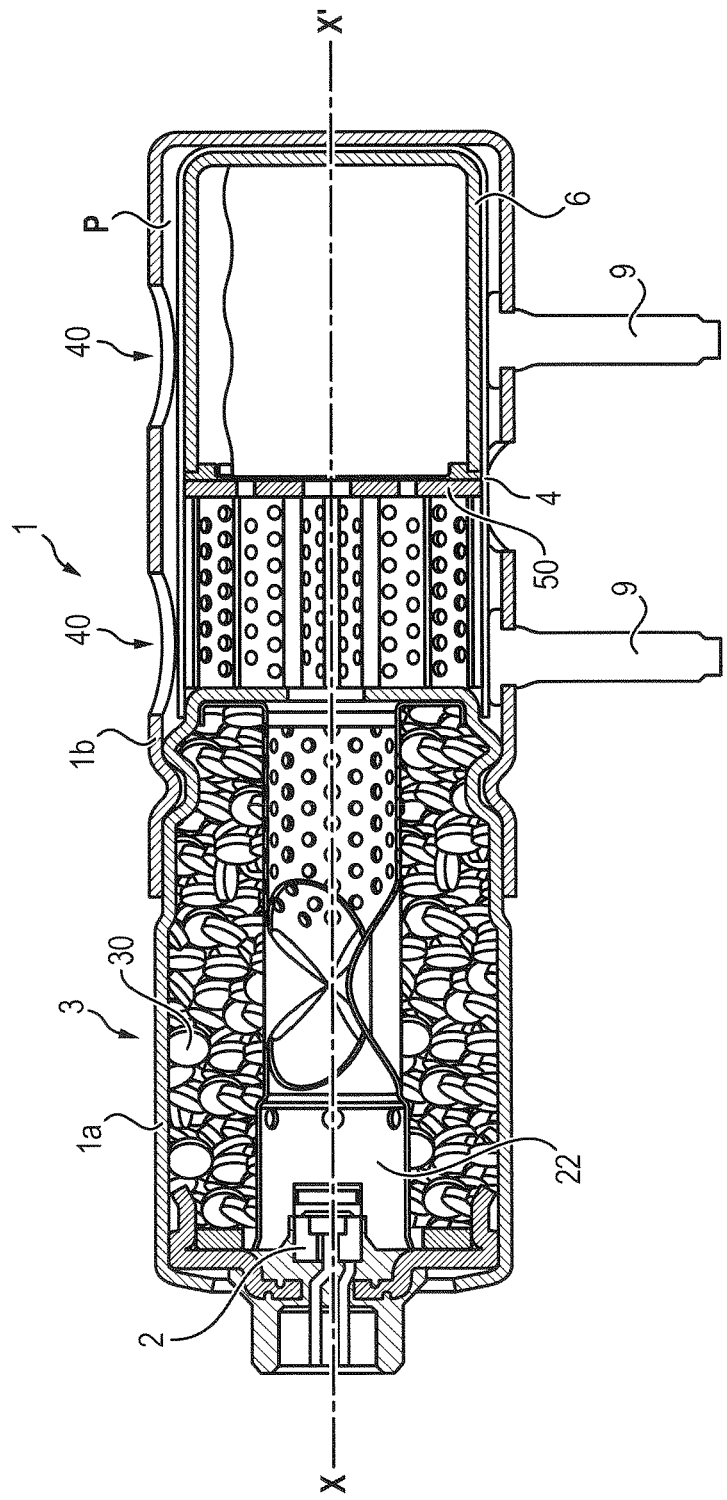
FIGS. 13 to 16 are front views according to a median and longitudinal cross-section plane of four other embodiments.

The embodiment shown in FIG. 13 includes the general architecture already described in reference to the generator in FIG. 1. The numerical references that are identical to those concerning this first embodiment designate identical elements.

Figure 14:
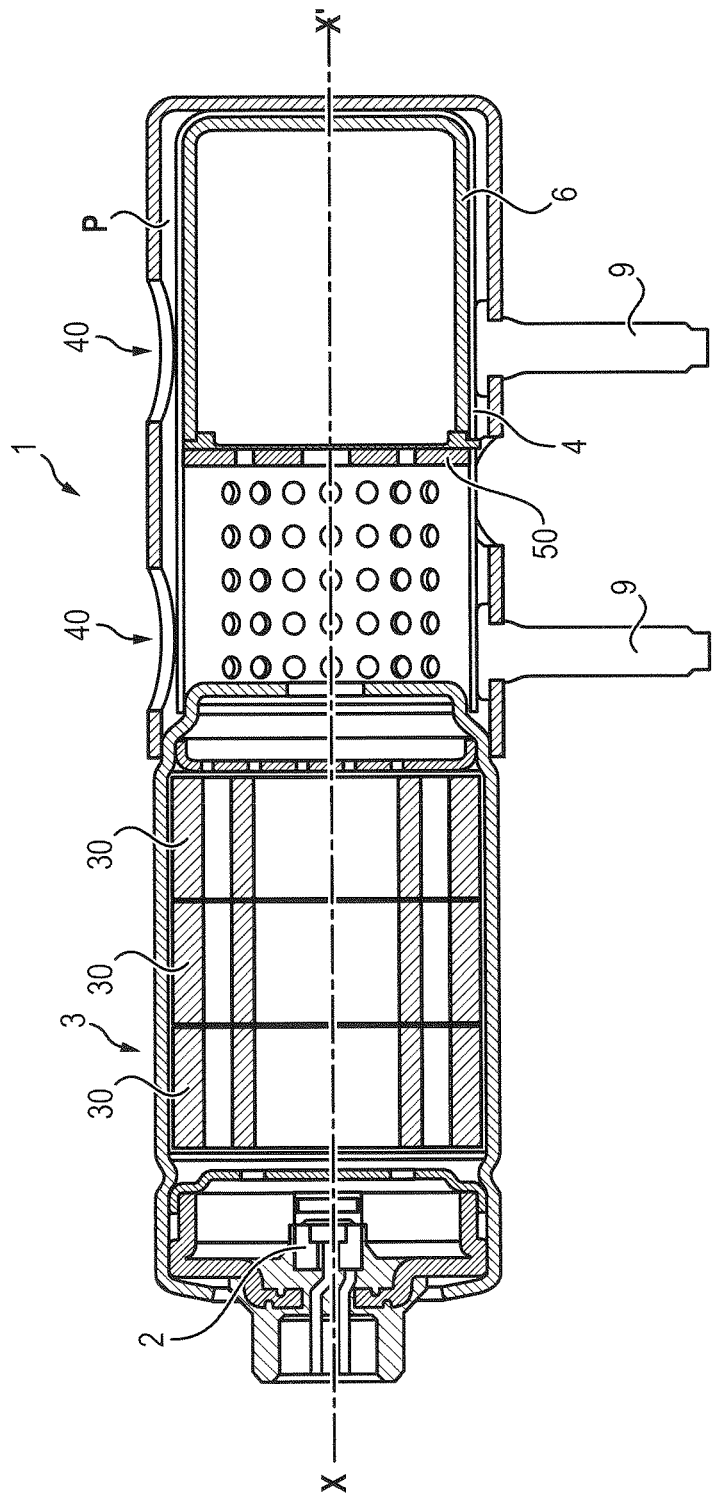
Figure 15:
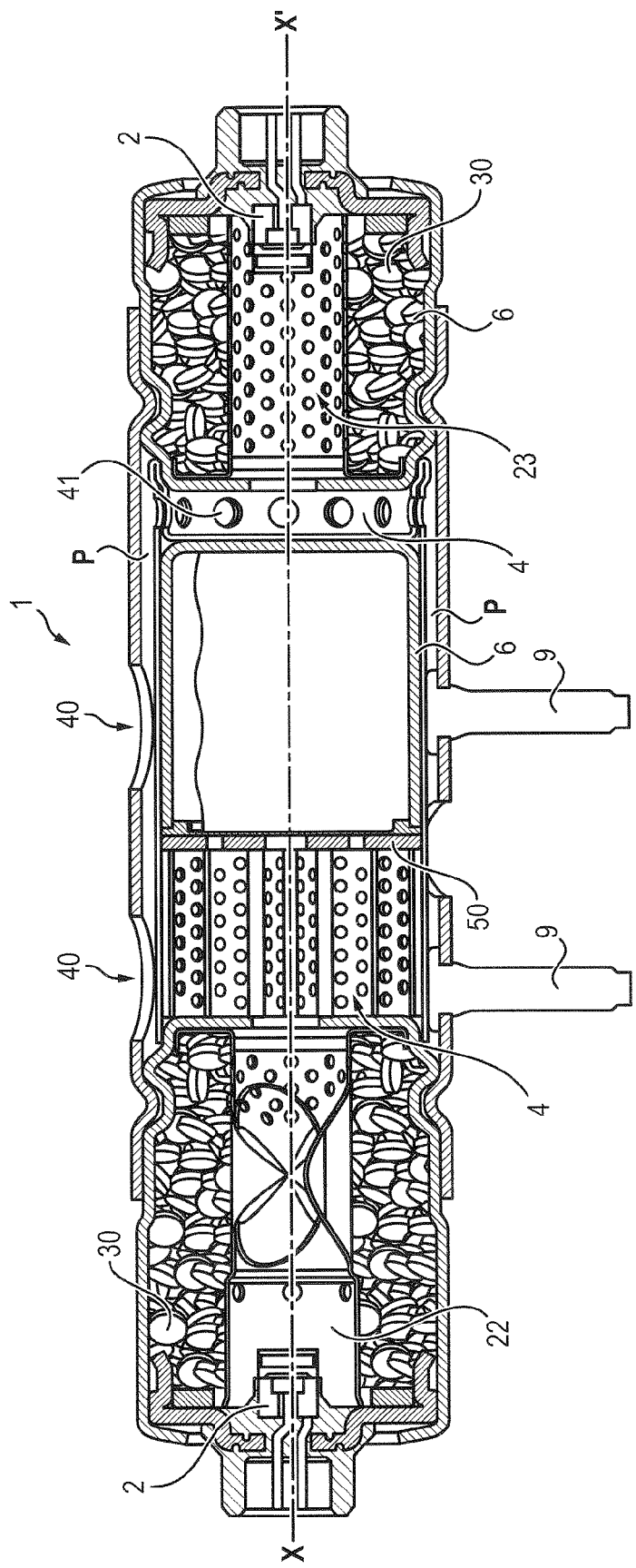
Figure 16:
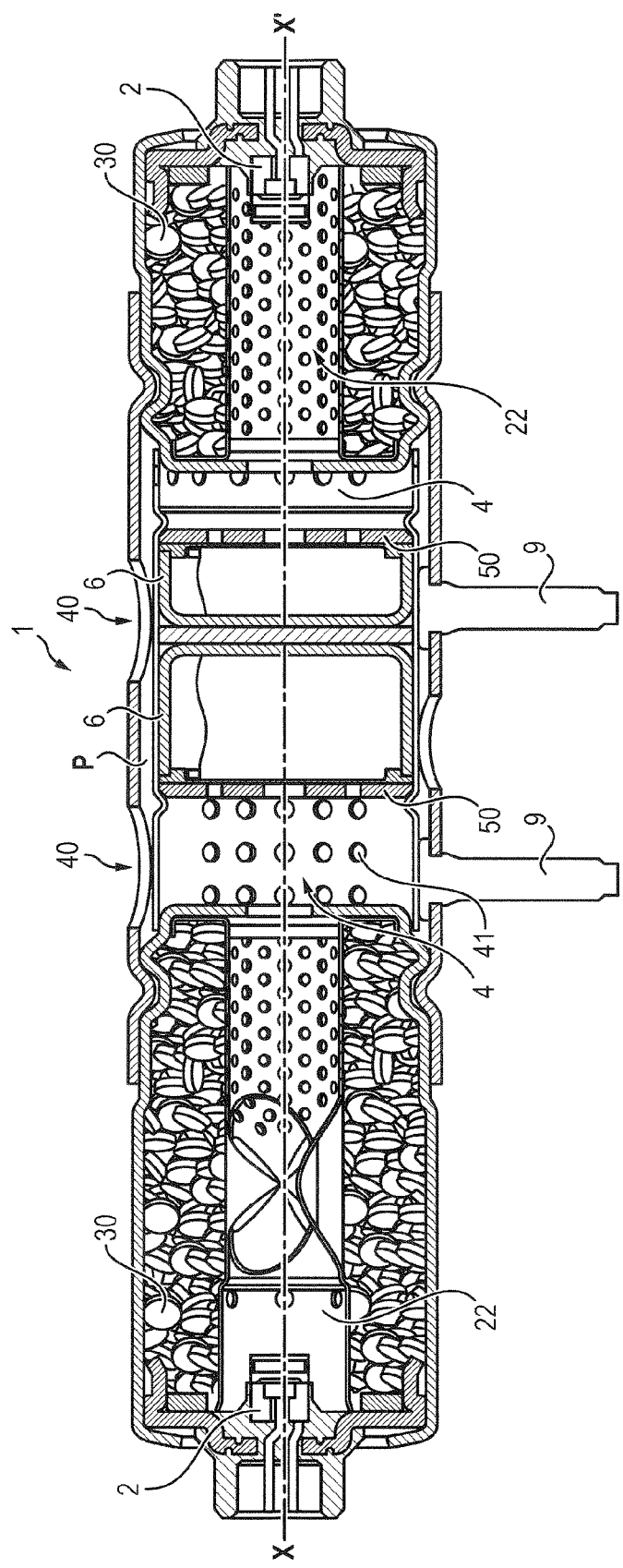

This applies to the embodiment in FIG. 13, but also to those in FIGS. 14 to 16.

In the alternative embodiment in FIG. 13, this relates to a generator comprised of a case 1 formed of two portions 1a and 1b which are crimped together. The portion 1a receives a pyrotechnic initiator 2 with relay charge and a combustion chamber 3 wherein the pyrotechnic charge is in the form of pellets.

In the extension of the initiator is a perforated tube 22 intended to direct the gases generated by the initiator in the direction of the pellets of the pyrotechnic charge, while preventing the debris of the latter from being expulsed out of the combustion chamber.

As is well known, this cylindrical part 22 is provided with a multitude of small holes which allow the gases to pass through but prevent the escape of pyrotechnic charge particles.

This element 22 communicates with the diffusion chamber 4 by an opening arranged in the bottom of the portion 1a.

The diffusion chamber 4, as well as the storage chamber 6 of the liquid material M, have the same diameter and are engaged inside the portion 1b of the case, in such a way that there is an annular zone between the unit formed by the diffusion chamber 4 and the storage chamber 6 in relation to the outside wall of the portion 1b. This annular zone constitutes a plenum chamber P of which the purpose is to cool the gases before they exit from the generator.

Of course, a wall 50 of the same type as that already described hereinabove is inserted between the diffusion chamber and the storage chamber 6.

As such, during the combustion of the pyrotechnic charge, the storage chamber 6 is open and generates the emission of a "liquid piston" which lowers the temperature of the hot gases and directs them toward the exterior, via the plenum chamber P.

The exiting of the gases toward the exterior is done through the openings 40 of which some of the openings are not entirely across from the plenum chamber 4, in such a way that the portion of the gases that flows, via the chamber P, toward this outlet will undergo a further reduction in temperature during this travel.

Note that the area that delimits the plenum chamber P makes possible a relatively easy fastening of latching lugs 9 of the generator to an element of the vehicle.

The embodiment in FIG. 14 is very similar to that which has just been described, other than that the pyrotechnic charge 30 is here constituted of three cylinders of pyrotechnic material arranged against one another in the longitudinal direction.

In reference to FIG. 15, this relates to a structure that is relatively similar to that in FIG. 9a, i.e. that here there are two opposite combustion chambers 30, two diffusion chambers 4 and a single liquid material storage chamber 6.

Moreover, the chamber 6 communicates only with one of the diffusion chambers 4 via a partition wall 50 in accordance with what has been described hereinabove.

In other terms, the combustion chamber 30 located on the right of FIG. 15 does not include any means allowing for the cooling of the hot gases coming from the combustion of the pyrotechnic charge 30.

These gases exit the combustion chamber via the second diffusion chambers 4 (located on the right of the figure) including openings 41 which open directly into the plenum chamber P.

The same applies for the gases emerging from the other combustion chamber 3 which are cooled by the material contained in the chamber 6.

These gases are also received in the plenum chamber P and are mixed with those coming from the other chamber, in such a way that the gases existing via the openings 40 have their temperature correctly lowered.

Logically, the starting of the first combustion chamber with cooling is triggered before that of the second chamber in such a way as to first generate cooled gases.

Finally, in FIG. 16, this relates substantially to the same structure except that here there are two separate chambers 6 for storing liquid that each communicate with an associated combustion chamber 30 via a partition wall 50 such as mentioned hereinabove.

In these conditions, the gases that exit the generator via the plenum chamber P are cooled in a substantially equivalent manner, whether they come from the first or the second combustion chamber.

The invention claimed is:

1. A gas generator for inflation of an airbag, the gas generator comprising:
   a case;
   a combustion chamber enclosed by the case, the combustion chamber containing at least one pyrotechnic charge able to be ignited by an initiator;
   a diffusion chamber enclosed by the case, the diffusion chamber having at least one communication orifice with an exterior able to receive gases coming from combustion of the charge and evacuate gases towards the exterior;
   a storage chamber; and
   a material stored in the storage chamber, the material able to be released from the storage chamber under effect of the combustion of the pyrotechnic charge to change state endothermically under effect of gases coming from the combustion, then to be evacuated via the diffusion chamber, the material being a liquid stored at atmospheric pressure;
   wherein the storage chamber includes at least one inlet opening and at least one outlet opening, the inlet and outlet openings normally being sealed in absence of combustion of the charge, the storage chamber separated from the diffusion chamber by a fixed wall through which are arranged the at least one outlet opening,
   wherein the charge and the combustion and diffusion chambers are dimensioned such that under effect of the combustion, at least one portion of a flow of gas generated by the pyrotechnic charge opens the at least one inlet opening and penetrates into the storage chamber, thereby provoking escape of the material via the at least one outlet opening, then endothermic change of state of the material, mainly in the diffusion chamber,
   wherein the diffusion chamber is between the combustion chamber and the storage chamber.

2. The gas generator according to claim 1, wherein the material is a material able to be vaporised.

3. The gas generator according to claim 1, wherein a surface of the at least one inlet opening is greater than a surface of the at least one outlet opening.

4. The gas generator according to claim 1, wherein the diffusion chamber is arranged axially between the combustion chamber and the storage chamber, and further wherein the at least one inlet opening is arranged in the fixed wall.

5. The gas generator according to claim 4, wherein the at least one inlet opening is centred on a longitudinal axis of the casing and that at least one outlet opening extends peripherally.

6. The gas generator according to claim 1, further comprising an intermediate chamber disposed axially along a longitudinal axis of the case between the combustion chamber and the diffusion chamber, the storage chamber arranged inside the intermediate chamber, and the at least one inlet opening of the storage chamber emerging inside the intermediate chamber.

7. The gas generator according to claim 6, wherein the case is cylindrical, the storage chamber is annularly shaped and centred on the axis, and a length of the case taken along the axis is less than a length of the intermediate chamber.

8. The gas generator according to claim 6, wherein the storage chamber extends in a center of the intermediate chamber along the axis, and a length of the storage chamber taken along the axis is less than a length of the intermediate chamber.

9. The gas generator according to claim 1, wherein the material is contained in a frangible envelope which, in absence of combustion of the pyrotechnic charge, is applied against the inlet and outlet openings in order to seal them.

10. The gas generator according to claim 1, wherein the inlet and outlet openings are, in absence of combustion of the charge, sealed by frangible seals.

11. The gas generator according to claim 1, wherein at least a portion of a flow of gas generated by the pyrotechnic charge opens one or more of the at least one inlet openings.

12. The gas generator according to claim 2, wherein the material is comprised of water and of a mineral anti-icing compound, organic or of a mixture thereof.

13. The gas generator according to claim 12, wherein the material is comprised of water and of an anti-icing compound, and wherein the anti-icing compound is selected from a group including calcium chloride and potassium carbonate.

14. The gas generator according to claim 4, further comprising a second combustion chamber containing at least one second pyrotechnic charge able to be ignited by a second initiator, a second diffusion chamber having at least one communication orifice with the exterior, and a second storage chamber for a liquid material stored at atmospheric pressure, the storage chambers being an extension of one another.

15. The gas generator according to claim 4, further comprising a second combustion chamber containing at least one second pyrotechnic charge able to be ignited by a second initiator, a second diffusion chamber having at least one communication orifice with the exterior, and a single and unique storage chamber for a liquid material stored at atmospheric pressure.

16. The gas generator according to claim 1, wherein the diffusion chamber is defined by a tubular cylindrical part distinct from and disposed within the case, the tubular cylindrical part including a plurality of holes spaced both radially thereabout and axially there along.

17. The gas generator according to claim 1, the at least one inlet opening and the at least one outlet opening are configured such that a pressure exerted on the liquid sprays the liquid into the diffusion chamber to mix with the flow of gas to vaporize the liquid prior to release from the inflator.

18. The gas generator according to claim 1, wherein the pressure exerted on the liquid is greater than a pressure in the diffusion chamber.

19. A gas generator for inflation of an airbag, the gas generator comprising:
a housing;
a combustion chamber enclosed by the housing, the combustion chamber containing at least one pyrotechnic charge able to be ignited by an initiator;
a diffusion chamber enclosed by the housing, the diffusion chamber for receiving gases from combustion of the charge and evacuating gases from the housing; and
a storage chamber containing a liquid under atmospheric pressure, the storage chamber includes at least one inlet opening and at least one outlet opening, the at least one inlet opening and the at least one outlet opening configured such that pressure created by combustion gases exert a force of the liquid through the at least one inlet opening that sprays the liquid from the at least one outlet opening into the diffusion chamber to mix with the combustion gases and vaporize prior to release from the inflator,
wherein the diffusion chamber is between the combustion chamber and the storage chamber and is defined by a tubular cylindrical part distinct from and disposed within the housing, the tubular cylindrical part including a plurality of holes spaced both radially thereabout and axially there along.

20. The gas generator according to claim 19, wherein the pressure exerted on the liquid is greater than a pressure in the diffusion chamber.

21. The gas generator according to claim 19, wherein the at least one outlet transmits the liquid into the diffusion chamber in a fine mist.

22. A gas generator for inflation of an airbag, the gas generator comprising:
a housing;
a combustion chamber enclosed by the housing, the combustion chamber containing at least one pyrotechnic charge able to be ignited by an initiator;
a diffusion chamber enclosed by the housing, the diffusion chamber having at least one communication orifice with an exterior able to receive gases coming from combustion of the charge and evacuate gases towards the exterior; and
a storage chamber containing a material stored in the storage chamber, the material able to be released from the storage chamber under effect of the combustion of the pyrotechnic charge to change state endothermically within the diffusion chamber under effect of gases coming from the combustion, then to be evacuated via the diffusion chamber, the material being a liquid stored at atmospheric pressure;
wherein the storage chamber includes at least one inlet opening and at least one outlet opening, the inlet and outlet openings normally being sealed in absence of combustion of the charge,
wherein the charge and the combustion and diffusion chambers are dimensioned such that under effect of the combustion, at least one portion of a flow of gas generated by the pyrotechnic charge opens the at least one inlet opening and penetrates into the storage chamber, thereby provoking escape of the material via the at least one outlet opening, then endothermic change of state of the material, mainly in the diffusion chamber,
wherein the at least one inlet opening and the at least one outlet opening are configured such that a pressure exerted on the liquid sprays the liquid into the diffusion chamber to mix with the flow of gas to vaporize the liquid prior to release from the inflator,
wherein the pressure exerted on the liquid is greater than a pressure in the diffusion chamber, and
wherein the at least one outlet transmits the liquid into the diffusion chamber in a fine mist.

* * * * *